United States Patent
Minami et al.

(10) Patent No.: US 10,227,496 B2
(45) Date of Patent: Mar. 12, 2019

(54) COMPOSITE CONDUCTIVE PARTICLE, CONDUCTIVE RESIN COMPOSITION CONTAINING SAME AND CONDUCTIVE COATED ARTICLE

(71) Applicant: TOYO ALUMINIUM KABUSHIKI KAISHA, Osaka (JP)

(72) Inventors: Kazuya Minami, Osaka (JP); Hideaki Minamiyama, Osaka (JP); Kazunori Koike, Osaka (JP)

(73) Assignee: TOYO ALUMINIUM KABUSHIKI KAISHA, Osaka-Shi, Osaka (JP)

( * ) Notice: Subject to any disclaimer, the term of this patent is extended or adjusted under 35 U.S.C. 154(b) by 98 days.

(21) Appl. No.: 15/110,378

(22) PCT Filed: Jan. 9, 2015

(86) PCT No.: PCT/JP2015/050521
§ 371 (c)(1),
(2) Date: Jul. 7, 2016

(87) PCT Pub. No.: WO2015/107996
PCT Pub. Date: Jul. 23, 2015

(65) Prior Publication Data
US 2016/0333195 A1    Nov. 17, 2016

(30) Foreign Application Priority Data

Jan. 14, 2014   (JP) .................................. 2014-004223

(51) Int. Cl.
*H01B 1/02* (2006.01)
*C09D 5/24* (2006.01)
(Continued)

(52) U.S. Cl.
CPC ................. *C09D 5/24* (2013.01); *C09D 7/62* (2018.01); *C09D 133/08* (2013.01);
(Continued)

(58) Field of Classification Search
CPC ......................................................... H01B 1/02
See application file for complete search history.

(56) References Cited

U.S. PATENT DOCUMENTS

2002/0142094 A1   10/2002   Fukushima et al.
2012/0219787 A1*  8/2012   Jun .......................... H01B 1/22
                                               428/328

FOREIGN PATENT DOCUMENTS

| CN | 101309993 A | 11/2008 |
| CN | 101842515 A | 9/2010 |
(Continued)

OTHER PUBLICATIONS

Office Action, with English translation, dated Aug. 7, 2018 in corredponding Korean applicaiton No. 10-2016-7020293.
(Continued)

*Primary Examiner* — William D Young
(74) *Attorney, Agent, or Firm* — Birch, Stewart, Kolasch & Birch, LLP

(57) ABSTRACT

A composite conductive particle according to the present invention includes a first conductive particle having a particle diameter of greater than or equal to 0.1 μm and less than or equal to 50 μm; and a second conductive particle adhering to the surface of the first conductive particle and having a particle diameter of greater than or equal to 50 nm and less than or equal to 1000 nm, and the first conductive particle is composed of a first particle and a first metal coating covering the surface of the first particle, the second conductive particle is composed of a second particle and a second metal coating covering the surface of the second particle, a particle diameter of the first conductive particle is larger than a particle diameter of the second conductive particle, and an adhering rate of the second conductive particle.

5 Claims, 4 Drawing Sheets

(51) Int. Cl.
*C09D 201/00* (2006.01)
*H01B 1/22* (2006.01)
*C09D 133/08* (2006.01)
*C09D 7/62* (2018.01)
*C08K 9/02* (2006.01)

(52) U.S. Cl.
CPC ............ *C09D 201/00* (2013.01); *H01B 1/02* (2013.01); *H01B 1/22* (2013.01); *C08K 9/02* (2013.01)

(56) References Cited

FOREIGN PATENT DOCUMENTS

| | | |
|---|---|---|
| CN | 102549676 A | 7/2012 |
| CN | 103030728 A | 4/2013 |
| EP | 2166042 A1 | 3/2010 |
| JP | 61-257479 A | 11/1986 |
| JP | 62-297471 A | 12/1987 |
| JP | 4-277406 A | 10/1992 |
| JP | 2001-23435 A | 1/2001 |
| JP | 2003-13103 A | 1/2003 |
| JP | 2004-52044 A | 2/2004 |
| JP | 2006-161081 A | 6/2006 |
| JP | 2006-216343 A | 8/2006 |
| JP | 2006-228474 A | 8/2006 |
| JP | 2007-234588 A | 9/2007 |
| JP | 2008-111175 A | 5/2008 |
| JP | 2013-69678 A | 4/2013 |
| JP | 4877230 B2 | 2/2015 |
| KR | 10-2012-0098391 A | 9/2012 |
| TW | 200946629 A | 11/2009 |
| TW | 201202375 A1 | 1/2012 |
| WO | WO 2009/054371 A1 | 4/2009 |
| WO | WO 2009/063827 A1 | 5/2009 |
| WO | WO 2011/001910 A1 | 1/2011 |

OTHER PUBLICATIONS

Japanese Office Action with English translation dated Sep. 18, 2018 in corresponding Japanese Application No. 2015-557820.

* cited by examiner

COMPOSITE CONDUCTIVE PARTICLE, CONDUCTIVE RESIN COMPOSITION CONTAINING SAME AND CONDUCTIVE COATED ARTICLE

TECHNICAL FIELD

The present invention relates to a composite conductive particle, a conductive resin composition containing the same, and a conductive coated article.

BACKGROUND ART

Conventionally, conductive resin compositions such as conductive pastes, conductive paints, and conductive adhesives are used in various applications such as electronic components and electronic circuits. As conductive particles used in such conductive resin compositions, spherical or flaky silver (Ag) particles, copper (Cu) particles and the like are known. However, Ag has a problem of high price although it has very excellent conductivity, and Cu has a problem that the conductivity cannot be kept for a long time because it is easily oxidized and has poor corrosion resistance.

In contrast to the above, Japanese Patent Laying-Open No. 2008-111175 (PTD 1), Japanese Patent Laying-Open No. 2004-52044 (PTD 2), and Japanese Patent Laying-Open No. 2006-161081 (PTD 3) propose conductive particles in which the surfaces of Cu particles are covered with Ag. The conductive particles have characteristics of excellent conductivity, corrosion resistance, and moisture resistance. However, since Cu has a large specific gravity, conductive particles are easy to sediment in a conductive resin composition when Cu particles are used as core particles, and thus there is a fundamental problem of poor operability (handling easiness).

As a technique for solving the aforementioned problem of specific gravity, conductive particles obtained by covering the surfaces of silica particles having a small specific gravity with Ag, and conductive particles obtained by covering the surfaces of resin having a small specific gravity with Ag have been developed. For example, Japanese Patent Laying-Open No. 2001-23435 (PTD 4), Japanese Patent Laying-Open No. 61-257479 (PTD 5) and Japanese Patent Laying-Open No. 62-297471 (PTD 6) disclose techniques of precipitating metal on the surfaces of silica particles by using the electroless plating process after preliminarily subjecting the silica particles to a surface treatment using a silicon-based polymer compound having a reducing property or using a silane coupling agent. Also, for example, Japanese Patent Laying-Open No. 2006-228474 (PTD 7) discloses a composite conductive particle obtained by coating the surface of resin with a metallic conductive film, in which 70 to 90% of the surface area of the conductive film form rising protrusions.

CITATION LIST

Patent Document

PTD 1: Japanese Patent Laying-Open No. 2008-111175
PTD 2: Japanese Patent Laying-Open No. 2004-52044
PTD 3: Japanese Patent Laying-Open No. 2006-161081
PTD 4: Japanese Patent Laying-Open No. 2001-23435
PTD 5: Japanese Patent Laying-Open No. 61-257479
PTD 6: Japanese Patent Laying-Open No. 62-297471
PTD 7: Japanese Patent Laying-Open No. 2006-228474

SUMMARY OF INVENTION

Technical Problems

However, since resin or silica by itself does not have conductivity, it is necessary to increase the use amount of Ag for allowing the conductive particles obtained from core particles made of resin or silica to exert high conductivity, and as a result, the production cost tends to increase. Particularly in the techniques disclosed in PTDs 4 to 6, it is necessary to preliminarily subject the surfaces of silica particles to a surface treatment using a silicon-based polymer compound or a silane coupling agent, and this leads to further increase in the production cost. In the technique disclosed in PTD 7, since projections are formed in a large part of the surfaces of the composite conductive particles, the filling property of the conductive particles decreases when a conductive resin composition is prepared using the same, and as a result, the problem arises that the conductivity required for the conductive resin composition cannot be imparted.

The present invention has been devised in light of the aforementioned current circumstances, and it is an object of the invention to provide a composite conductive particle having high conductivity and high filling property, a conductive resin composition containing the same, and a conductive coated article.

Solutions to Problems

A composite conductive particle of the present invention includes a first conductive particle having a particle diameter of greater than or equal to 0.1 µm and less than or equal to 50 µm, and a second conductive particle adhering to a surface of the first conductive particle and having a particle diameter of greater than or equal to 50 nm and less than or equal to 1000 nm, and the first conductive particle is composed of a first particle and a first metal coating covering a surface of the first particle, and the second conductive particle is composed of a second particle and a second metal coating covering a surface of the second particle, and a particle diameter of the first conductive particle is larger than a particle diameter of the second conductive particle, and an adhering rate of the second conductive particle to the first conductive particle is greater than or equal to 2% and less than or equal to 40%.

In the composite conductive particle, preferably, each of the first particle and the second particle is formed of silica.

In the composite conductive particle, preferably, each of the first metal coating and the second metal coating is formed of at least one selected from the group consisting of silver, gold, copper, nickel, platinum, tin, and alloys thereof.

In the composite conductive particles, preferably, a protective layer containing an organic acid is provided.

The present invention also relates to a conductive resin composition containing the composite conductive particle as a conductive material, and a conductive coated article having a base and a coated film formed of the conductive resin composition on the base.

Advantageous Effects of Invention

The composite conductive particle of the present invention has high conductivity and high filling property. A conductive resin composition and a conductive coated article containing the composite conductive particle can have high conductivity.

DESCRIPTION OF EMBODIMENTS

Figure 1:
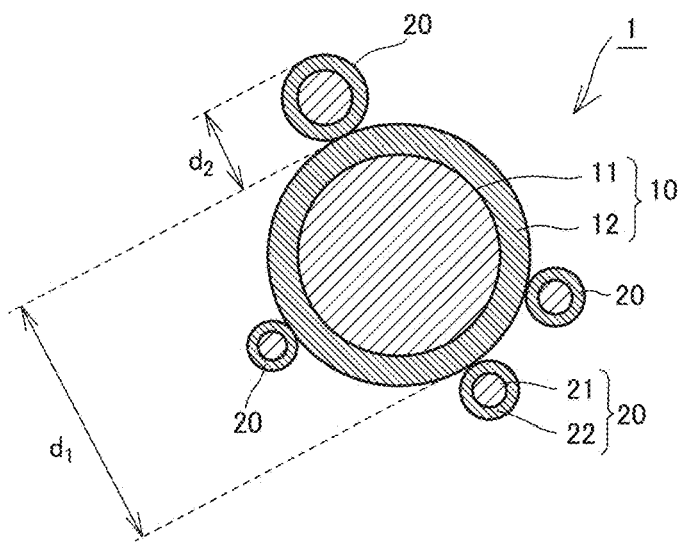
FIG. 1 is a sectional view schematically showing a structure of a composite conductive particle according to an embodiment.

Hereinafter, a composite conductive particle, a conductive resin composition containing the same and a conductive coated article of the present invention will be described in detail by referring to the drawings.

<Composite Conductive Particle>

Referring to FIG. 1, a composite conductive particle 1 according to the present embodiment includes a first conductive particle 10 having a particle diameter $d_1$ of greater than or equal to 0.1 μm and less than or equal to 50 μm, and a second conductive particle 20 adhering to the surface of first conductive particle 10 and having a particle diameter $d_2$ of greater than or equal to 50 nm and less than or equal to 1000 nm. First conductive particle 10 is composed of a first particle 11 and a first metal coating 12 covering the surface of first particle 11, and second conductive particle 20 is composed of a second particle 21 and a second metal coating 22 covering the surface of second particle 21. Particle diameter $d_1$ of first conductive particle 10 is larger than particle diameter $d_2$ of second conductive particle 20, and an adhering rate of second conductive particle 20 to first conductive particle 10 is greater than or equal to 2% and less than or equal to 40%. The conductive particle of the present invention may contain an inevitable impurity, and may contain other arbitrary component as far as the effect of the present invention is exerted.

The term "adhere" used herein refers to the condition that the relevant objects bind each other physically, and differs from the condition that they are simply in contact with each other. Also, this condition can bear physical impacts (for example, stirring operation, coating operation and so on) applied to the conductive particles at least for using the conductive particles.

(Adhering Rate)

First, the adhering rate will be described. The adhering rate of composite conductive particle 1 (adhering rate of second conductive particle 20 to first conductive particle 10) can be calculated according to the following method. That is, an electronic image of composite conductive particle 1 is obtained by using a scanning electron microscope (SEM). In the electronic image, the one having a structure in which a plurality of particles (second conductive particle 20) having particle diameter $d_2$ (provided that $d_1 > d_2$) adhere to the surface of one particle (first conductive particle 10) having particle diameter $d_1$ corresponds to composite conductive particle 1.

Figure 2:
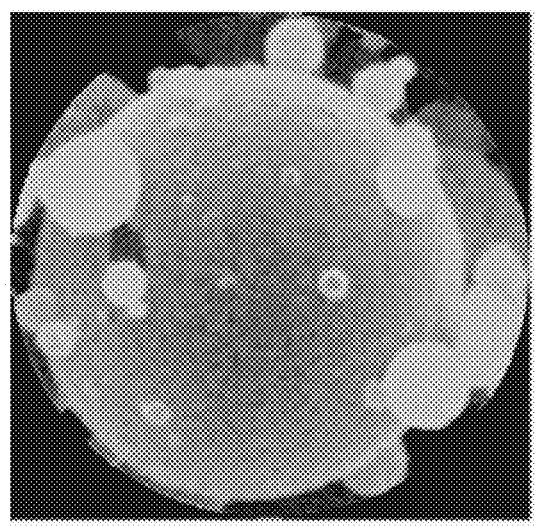
FIG. 2 is a view showing an SEM photograph of a composite conductive particle.

FIG. 2 is a view showing an SEM photograph of a composite conductive particle. In FIG. 2, the particle having the largest particle diameter is first conductive particle 10, and the plurality of particles having smaller particle diameters adhered to the surface of first conductive particle 10 are second conductive particles 20. That is, FIG. 2 is an SEM photograph showing one composite conductive particle 1 in an observation field.

In the electronic image, whether the particles are "in adhering condition" or "in aggregating condition" can be distinguished according to the relation between the condition and particle diameter of the particles. For example, when a large cluster formed by a large number of particles (particle diameters thereof are irrelevant) closely adhering to each other is observed, each particle that forms the cluster can be classified into "in aggregating condition". On the other hand, when a plurality of particles having particle diameter $d_2$ (provided that $d_1 > d_2$) are observed on the surface of one particle having particle diameter $d_1$ in such a manner that they are overlapped or linked with each other as described above, it can be classified into "in adhering condition". In the electronic image, the condition that particles are three-dimensionally overlapped with each other is sometimes observed. The electronic image in such a condition is removed from the object to be observed because the back faces or the front faces of the mutually overlapping particles are not suitable for observation in the electronic image.

Figure 3:
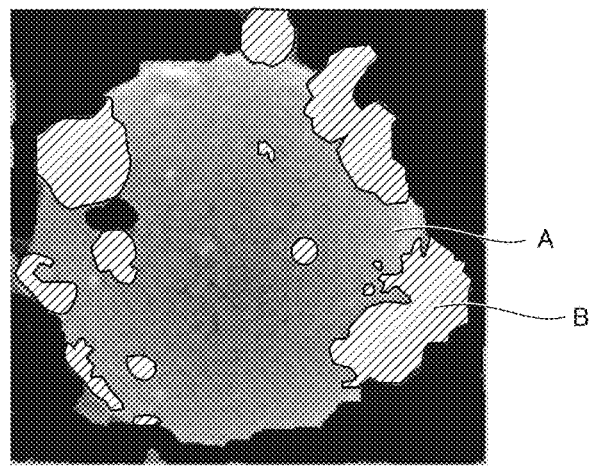
FIG. 3 is a view showing an image after binarization of the SEM photograph of FIG. 2.

As shown in FIG. 2, in the SEM photograph, the region occupied by second conductive particle 20 adhering to the surface of first conductive particle 10 in composite conductive particle 1 tends to exhibit higher brightness than the region occupied by first conductive particle 10. Therefore, by binarizing the electronic image as shown in FIG. 3, it is possible to calculate an area S1 of the region occupied by first conductive particle 10 (region A in FIG. 3) and an area S2 of the region occupied by second conductive particle 20 (region B in FIG. 3) in the region occupied by one composite conductive particle 1. In FIG. 3, region B includes all regions hatched with an oblique line.

Then by applying the respective values of areas S1, S2 to the following formula (1), it is possible to calculate the aforementioned adhering rate. In this description, the adhering rate is an average value of results measured for greater than or equal to 50 composite conductive particles observed in one SEM photograph.

$$\text{Adhering rate (\%)} = S2/(S1+S2) \times 100 \tag{1}$$

In composite conductive particle 1 according to the present embodiment, the adhering rate of second conductive particles 20 to first conductive particle 10 is greater than or equal to 2% and less than or equal to 40%. In this case, composite conductive particle 1 can achieve both high conductivity and high filling property. On the other hand, when the adhering rate is less than 2%, the conductivity is insufficient, and when the adhering rate is greater than 40%, the filling property is insufficient. The adhering rate is more preferably greater than or equal to 4% and less than or equal to 35%.

(First Conductive Particle and Second Conductive Particle)

Returning to FIG. 1, the shapes of first conductive particle 10 and second conductive particle 20 are not particularly limited, and they may have various shapes including spherical shape, granular shape, disc-like shape, columnar shape, cube, rectangular parallelepiped, plate-like shape, needle-like shape, fibrous shape, filler shape, and dendritic shape. Owing to the production method, respective shapes of first particle 11 and second particle 21 are taken over by shapes of first conductive particle 10 and second conductive particle 20. In the present description, the term spherical shape does not intend a mathematically spherical shape, but means the shape recognizable as a spherical shape at first glance.

Also as described above, first conductive particle 10 has particle diameter $d_1$ of greater than or equal to 0.1 µm and less than or equal to 50 µm, second conductive particle 20 has particle diameter $d_2$ of greater than or equal to 50 nm and less than or equal to 1000 nm, and particle diameter $d_1$ is larger than particle diameter $d_2$. Respective particle diameters of first conductive particle 10 and second conductive particle 20 can be measured by analyzing an SEM photograph. Since first conductive particle 10 and second conductive particle 20 respectively have such particle diameters, composite conductive particle 1 can have high filling property while having high conductivity. Particle diameter $d_1$ is more preferably greater than or equal to 1 µm and less than or equal to 20 µm, further preferably greater than or equal to 1 µm and less than or equal to 5 µm, and particle diameter $d_2$ is more preferably greater than or equal to 100 nm and less than or equal to 950 nm, further preferably greater than or equal to 100 nm and less than or equal to 700 nm.

Here, particle diameter $d_1$ is an average value of particle diameters of arbitrary greater than or equal to 50 first conductive particles 10 observed in the SEM photograph, and similarly particle diameter $d_2$ is an average value of particle diameters of arbitrary greater than or equal to 50 second conductive particles 20 observed in the SEM photograph. When the shape of first conductive particle 10 or second conductive particle 20 is spherical, diameters of first conductive particle 10 and second conductive particle 20 are defined as particle diameter $d_1$ and particle diameter $d_2$, respectively. The shape of first conductive particle 10 or second conductive particle 20 has sides of different lengths as in a plate shape or a needle shape, distances of respective long sides of first conductive particle 10 and second conductive particle 20 are defined as particle diameter $d_1$ and particle diameter $d_2$.

(First Particle and Second Particle)

Materials of first particle 11 forming the core of first conductive particle 10, and second particle 21 forming the core of second conductive particle 20 are not particularly limited, and metals such as aluminum, copper, nickel and tin, various inorganic substances such as silica, glass, alumina, and ceramics, and organic substances such as resin can be used. First particle 11 and second particle 21 are made of the same material. This attributes to the production method as will be described later.

From the viewpoint of decreasing the specific gravity of composite conductive particle 1, first particle 11 and second particle 21 are preferably formed of a material having a small specific gravity, and are preferably formed of any one of resin, silica, alumina, aluminum, glass, zirconia, silicon carbide, boron nitride, and diamond, for example.

Examples of the resin may include, but are not particularly limited to, polyolefins such as polyethylene, polypropylene, polystyrene, polyvinyl chloride, polyvinylidene chloride, polytetrafluoroethylene, polyisobutylene, and polybutadiene, acryl resins such as polymethyl methacrylate and polymethyl acrylate, divinylbenzene copolymer resins such as divinylbenzene polymer resin, divinylbenzene-styrene copolymer, divinylbenzene-acrylate copolymer, and divinylbenzene-methacrylate copolymer, polyalkylene terephthalate, polysulfone, polyamide, polycarbonate, melamine-formaldehyde resin, phenol-formaldehyde resin, benzoguanamine-formaldehyde resin, and urea-formaldehyde resin.

As silica, melt silica or imperforate silica obtained by subjecting melt silica to a surface treatment is desirably used. Also glass is not particularly limited, and can be appropriately selected depending on the purpose, and from the viewpoint of reducing a load on an environment, non-lead glass is preferred. Metal may be contained as a component that forms glass.

In particular, first particle 11 and second particle 21 are preferably formed of silica. Since silica has higher wettability compared with resin, it is possible to form a metal coating uniformly on the surface of a silica particle in the later-described production method. Therefore, composite conductive particle 1 having first particle 11 and second particle 21 formed of silica can have homogenous first metal coating 12 and second metal coating 22. Also since silica is less likely to be varied by thermal contraction and is less likely to be swelled by a solvent compared with resin, it is possible to provide composite conductive particle 1 with stable quality by forming first particle 11 and second particle 21 of silica particles.

The shapes of first particle 11 and second particle 21 are not particularly limited, and they may have various shapes including spherical shape, granular shape, plate-like shape, needle-like shape, fibrous shape, disc-like shape, columnar shape, cube, rectangular parallelepiped, filler shape, and dendritic shape. Preferably, the shapes of first particle 11 and second particle 21 are spherical from the viewpoint of high dispersibility in the later-described plating treatment solution. In that case, it is possible to make the quality of composite conductive particle 1 more uniform.

(First Metal Coating and Second Metal Coating)

Materials of first metal coating 12 that covers first conductive particle 10 and second metal coating 22 that covers second conductive particle 20 are not particularly limited, and known metal can be used. It is to be noted that the material of first metal coating 12 and the material of second metal coating 22 are identical. This attributes to the production method as will be described later. Among others, silver (Ag), gold (Au), copper (Cu), nickel (Ni), platinum (Pt), tin (Sn), and alloys thereof have especially high conductivity, and thus it is preferred that first metal coating 12 and second metal coating 22 are formed of at least one selected from the group consisting of silver, gold, copper, nickel, platinum, tin, and alloys thereof. Each of first metal coating 12 and second metal coating 22 may be made up of a single metal layer, or may be made up of multiple layers of the same metal or different metals. Also the first metal coating and the second metal coating may contain non-metal such as phosphorus (P), boron (B), carbon (C) and sulfur (S) as long as conductivity of metal is not largely inhibited and the effect of the present invention is exerted.

Although first metal coating 12 preferably covers the entire surface of first particle 11, the coverage is not limited thereto, and first metal coating 12 may cover part of the surface of first particle 11. However, from the viewpoint of sufficiently exerting the effect, first metal coating 12 preferably covers at least greater than or equal to 70% of the surface of first particle 11. Although second metal coating 22 also preferably covers the entire surface of second particle 21, the coverage is not limited thereto, and second metal coating 22 may cover part of the surface of second particle 21. However, from the viewpoint of sufficiently exerting the effect, second metal coating 22 preferably covers at least greater than or equal to 70% of the surface of second particle 21.

An average film thickness of first metal coating 12 and second metal coating 22 is preferably greater than or equal to 0.1 nm. When it is less than 0.1 nm, it becomes difficult to cover each composite conductive particle 1, and decrease in conductivity tends to be caused. The film thickness is more preferably greater than or equal to 1 nm. The film thickness is further preferably less than or equal to 100 nm. When the film thickness is greater than 100 nm, variation in film thickness tends to be large, and aggregation tends to easily occur. Further, since it is necessary to increase the amount of metal to be used for increasing the film thickness, increase in the production cost can be led. Therefore, it is preferred to consider the balance of the required conductivity and the production cost.

Film thicknesses of first metal coating 12 and second metal coating 22 can be evaluated by observing the cross section of composite conductive particle 1 under an electron microscope of SEM or the like. Also uniformity of coverage, the degree of coverage and the like of first particle 11 (second particle 21) by first metal coating 12 (second metal coating 22) can be evaluated by similar observation of the cross section.

(Protective Layer)

Composite conductive particle 1 may have a protective layer that covers the surface thereof (not illustrated). The protective layer can be formed of a surface treatment agent such as fatty acid or fatty acid salt. By providing the surface of composite conductive particle 1 with the protective layer, the heat resistance increases, and thus the conductivity is kept. Although the protective layer preferably covers the entire surface of composite conductive particle 1, the coverage is not limited thereto, and the protective layer may cover part of composite conductive particle 1. The protective layer also functions as a dispersant and a lubricant for composite conductive particles when the composite conductive particles are blended into a conductive resin composition.

The surface treatment agent is not particularly limited, and can be appropriately selected depending on the purpose. Examples of the surface treatment agent may include fatty acids, fatty acid salts, surfactants, chelating agents, and organic metal compounds. Among these, fatty acids and fatty acid salts are preferred, and besides these, benzotriazoles are preferred. Examples of the fatty acids include propionic acid, caprylic acid, lauric acid, palmitic acid, oleic acid, acrylic acid, myristic acid, stearic acid, behenic acid, linoleic acid, and arachidonic acid. Particularly from the viewpoint of having high protective effect for first metal coating 12 and second metal coating 22, it is preferred to use at least one of stearic acid, oleic acid, and lauric acid. Only one surface treatment agent may be used or two or more surface treatment agents may be used together.

(Production Method)

A method for producing composite conductive particle 1 will be described. First, powder serving as a material of first particle 11 and second particle 21 is prepared. Examples of the powder include metal powder, resin powder and powder of particles of inorganic substances such as silica powder. The shape of the powder to be used is not particularly limited, and those of various shapes including spherical shape, granular shape, plate-like shape, needle-like shape, fibrous shape, filler shape, and dendritic shape can be used; however, from the viewpoint of high dispersibility in the later-described plating treatment solution, the spherical shape is preferred. When the shape of the material of first particle 11 and second particle 21 is spherical, first conductive particle 10 and second conductive particle 20 constituting composite conductive particle 1 to be produced are also spherical.

Since the powder used herein is a material of first particle 11 and second particle 21, the powder needs to contain at least both of smaller particles having a particle diameter smaller than particle diameter $d_2$ of second conductive particle 20 and larger particles that are larger than the smaller particles and have a particle diameter smaller than particle diameter $d_1$ (provided that $d_1 > d_2$) of first conductive particle 10.

For example, when commercially available powder is used, coexistence of the required smaller particles and larger particles can be confirmed based on the particle size distribution determined by a known particle size distribution determination method such as the laser diffraction method. In particular, D50 of the powder is preferably 1 μm to 50 μm, D10 is preferably 0.1 μm to 10 μm, and further D10 is more preferably 0.1 μm to 1 μm. In that case, production with high yield becomes possible. Here D50 and D10 respectively mean particle diameters at cumulative frequencies of 50% and 10% in the volumetric cumulative particle size distribution determined by the laser diffraction method.

In the present production method, powder having the particle size distribution as described above as the entire powder may be used for producing composite conductive particle 1, or the aforementioned smaller particles and larger particles may be separately prepared, and powder in which these particles are preliminarily mixed may be prepared. Further, in the mixing, the mixing ratio may be adjusted in consideration of the adhering rate of composite conductive particle 1.

Figure 4:
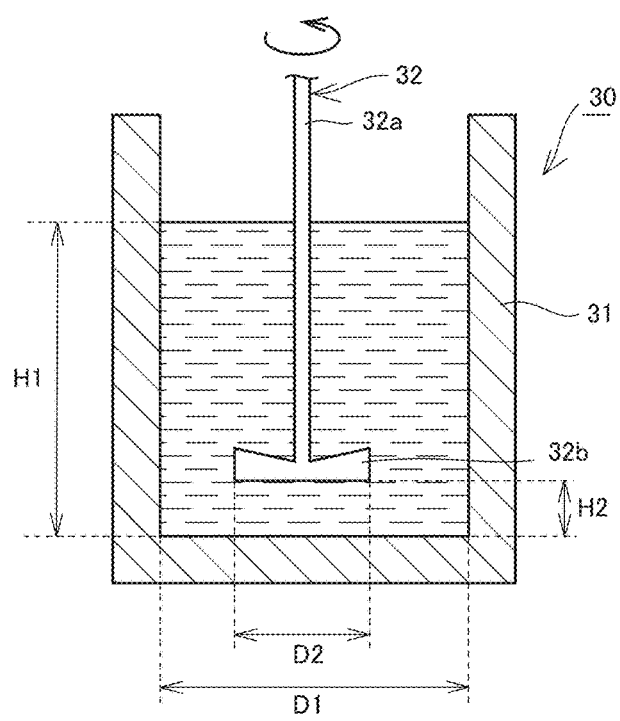
FIG. 4 is a schematic sectional view showing one example of a stirring device for use in production of a composite conductive particle according to an embodiment.

Next, the prepared powder is introduced into a stirring vessel of a stirring device, and the powder is brought into a slurry. As the stirring device, for example, a stirring device shown in FIG. 4 can be used. In FIG. 4, a stirring device 30 includes a stirring vessel 31, and a stirring blade 32 capable of stirring a slurry or the like contained in stirring vessel 31. Stirring blade 32 is made up of a shaft part 32a and a blade part 32b, and can rotate at a predetermined blade circumferential speed in the direction of the arrow in the drawing by a driving part that is not illustrated. In the present embodiment, a slurry of powder is introduced into stirring vessel 31.

Next, a catalyst for covering the surface of first particle 11 and second particle 21 with first metal coating 12 and second metal coating 22 is introduced into stirring vessel 31 as is needed. Also, first metal coating 12 and second metal coating 22 can be formed by direct contact with a plating treatment solution rather than applying a catalyst to the surface of first particle 11 and second particle 21. However, since a metal coating is formed more efficiently when a catalyst for electroless plating is adhered to each particle prior to an electroless plating treatment, it is preferred to introduce a catalyst.

As a method for adhering a catalyst, a method of treating with a solution containing palladium chloride after treating the surface of first particle 11 and second particle 21 with a hydrochloric acid solution containing stannous chloride, a method of treating with a solution containing palladium chloride and stannous chloride, and a method of activating by using a hydrochloric acid aqueous solution, a sulfuric acid aqueous solution or the like after treating the surface of first particle 11 and second particle 21 with a solution containing stannous chloride and palladium chloride can be exemplified. These methods are publicly known as the sensitizing-activating method or the catalyst method. In the present production method, such a publicly known catalyst applying method can be appropriately used.

Then, a plating treatment solution containing a metal salt, a reducing agent and a complexing agent is introduced into stirring vessel 31. As the metal salt, those stably dissolvable in a mixed solvent containing an organic solvent and an aqueous solvent are preferred, and nitrates, sulfates, nitrites, oxalates, carbonates, chlorides, acetates, lactates, sulfamates, fluorides, iodides, cyanides and the like can be used. The metal constituting the metal salt is the metal constituting first metal coating 12 and second metal coating 22.

As the reducing agent, those used in the electroless plating treatment method and publicly known can be used. Specific examples that can be used include saccharides such as glucose and saccharose, polysaccharides such as cellulose, starch and glycogen, polyhydric alcohols such as ethylene glycol, propylene glycol, and glycerol, hypophosphorous acid, formaldehyde, boron hydride, dimethylamine borane, trimethylamine borane, hydrazine tartrate, and salts thereof. Hydrazine tartrate is preferably an alkaline metal salt.

As the complexing agent, those used in the electroless plating treatment method and publicly known can be used. Specific examples that can be used include carboxylic acids such as succinic acid, oxycarboxylic acids such as citric acid and tartaric acid, glycine, ethylenediaminetetraacetic acid (EDTA), aminoacetic acid, and salts thereof, for example, alkaline metal salts, and ammonium salts. In the electroless plating treatment method, it is possible to suppress reprecipitation of metal by using such a complexing agent, and thus it is possible to allow the metal coating to grow stably.

Also it is preferred that pH of the plating treatment solution is adjusted appropriately depending on the kind of the metal constituting the metal salt. By adding sodium hydroxide, potassium hydroxide, ammonia water or the like to the plating treatment solution, the pH of the plating treatment solution can be adjusted to alkaline (pH 8 to 12), and by adding sulfuric acid, nitric acid, citric acid or the like, the pH of the plating treatment solution can be adjusted to acidic (pH 3 to 6), and by combination of these, the pH of the plating treatment solution can be adjusted to neutral (pH 6 to 8). Further, it is preferred to adjust the temperature of the plating treatment solution to 1 to 99° C. In this case, the plating reaction can be advanced efficiently.

By stirring the plating treatment solution with rotation of stirring blade 32, an electroless plating treatment is conducted. At this time, the blade circumferential speed of stirring blade 32 is controlled to greater than or equal to 1.5 m/sec and less than or equal to 10 m/sec.

In stirring device 30, the relation between an inner diameter D1 of stirring vessel 31 and an outer diameter D2 of stirring blade 32 (D1:D2) is preferably 7:3 to 5:5, more preferably 7:3 to 6:4. In this case, since dispersion of first particle 11 and second particle 21 in the plating treatment solution in stirring vessel 31 can be made more uniform, the control of the blade circumferential speed can be reflected uniformly. For a similar reason, the relation between a height H1 of the plating treatment solution and a height H2 of stirring blade 32 in stirring vessel 31 (H1:H2) is preferably 9.9:0.1 to 7:3, more preferably 9.9:0.1 to 9:1. Height H1 corresponds to the distance between the upper face of the bottom of stirring vessel 31 and the liquid level of the plating treatment solution, and height H2 corresponds to the distance between the upper face of the bottom and the lower face of blade part 32b. For improving the dispersibility in the vertical direction in stirring vessel 31, a baffle board (baffle) may be installed on the internal wall of stirring vessel 31 as is needed.

By the aforementioned electroless plating treatment, composite conductive particle 1 is formed in the plating treatment solution. Therefore, by subjecting the stirred slurry (plating treatment solution) to solid-liquid separation, a slurry of composite conductive particle 1 can be obtained, and by drying the slurry, composite conductive particle 1 can be obtained.

When the aforementioned protective layer is formed, the formation method is not particularly limited, and for example, a method of taking out composite conductive particle 1 from the treatment solution after the electroless plating treatment by solid-liquid separation or the like, and introducing composite conductive particle 1 into a solution containing fatty acid or organic acid which is to be a material for the protective layer can be employed. By this treatment, it is possible to produce composite conductive particle 1 having a protective layer.

As described above, composite conductive particle 1 can be produced efficiently by conducting the electroless plating treatment in specific conditions. In other words, by the simple treatment as described above, conductive particles in which the surface of each particle is covered with metal are produced, and among the conductive particles, second conductive particles 20 which are a plurality of "small-diameter conductive particles" having particle diameter $d_2$ can adhere to the surface of first conductive particle 10 which is a "large-diameter conductive particle" having particle diameter $d_1$ (provided that $d_1 > d_2$). Although the reason is not unclear, the present inventors consider as follows.

In the plating treatment solution, metal derived from a metal salt precipitates on the surface of a variety of large and small particles. As a result, conductive particles having various particle diameters are produced. When the blade circumferential speed at this time is less than 1.5 m/sec, the dispersibility of the slurry is low, so that all the conductive particles including "large-diameter conductive particles" and "small-diameter conductive particles" aggregate. In that case, not only "small-diameter conductive particles" but also other "large-diameter conductive particles" adhere to one "large-diameter conductive particle", so that it is impossible to produce composite conductive particle 1. This condition corresponds to the aforementioned "aggregating condition".

When the blade circumferential speed is greater than 10 m/sec, the dispersibility of the slurry is high, so that it becomes difficult for "large-diameter conductive particles" and "small-diameter conductive particles" to adhere to each other after they are individually covered with metal. Therefore, it is impossible to allow "small-diameter conductive particles" to adhere to the surface of "large-diameter conductive particles", and every conductive particle remains dispersed. It is generally desired that particles are dispersed in conducting a plating treatment on the particles.

In contrast to the above, when the blade circumferential speed is greater than or equal to 1.5 m/sec and less than or equal to 10 m/sec, dispersibility of the slurry does not cause the aggregation as described above, and provides the condition appropriate for "large-diameter conductive particles" and "small-diameter conductive particles" to come into contact with each other after each particle is covered. Therefore, a plurality of "small-diameter conductive particles" can adhere to one "large-diameter conductive particle", and as a result, composite conductive particle 1 is produced.

(Effect)

Composite conductive particle 1 according to the present embodiment can have high conductivity and high filling property. The reason why composite conductive particle 1 can have both characteristics of high conductivity and high filling property is conceivable as follows.

That is, conventional conductive particles have such a structure that a metal coating is formed on the surface of one core particle. In contrast to this, composite conductive particle 1 has such a structure that a plurality of second conductive particles 20 having a relatively small particle diameter adhere to the surface of first conductive particles 10 having a relatively large particle diameter. By having such a structure, contact points between particles increase and the filling property of particles increase, so that both characteristics of high conductivity and high filling property are provided.

In composite conductive particle 1, each of first conductive particle 10 and second conductive particle 20 is individually covered with a metal coating as shown in FIG. 1. That is, first particle 11 and second particle 21 are not in direct contact with each other. Therefore, the structure of composite conductive particle 1 is different from such a structure that the surfaces of multiple particles that are in direct contact with each other are integrally covered with metal, for example. In composite conductive particle 1, since first particle 11 and second particle 21 adhere to each other in the condition that they are individually covered in contrast to such a structure that they are integrally covered with metal, conduction at a contact point between first conductive particle 10 and second conductive particle 20 is enabled, and thus higher conductivity can be provided.

Here, if the coverage of first conductive particle 10 by second conductive particles 20 is too high, or if the particle diameter of second conductive particle 20 is too large, the structure of composite conductive particle 1 would become bulky, and the filling property would decrease. However, composite conductive particle 1 according to the present embodiment can exert sufficiently high filling property, because the adhering rate is greater than or equal to 2% and less than or equal to 40%, and particle diameter $d_1$ of first conductive particle 10 and particle diameter $d_2$ of second conductive particle 20 satisfy the aforementioned values.

<Conductive Resin Composition>

The conductive resin composition according to the present embodiment is featured by containing composite conductive particle 1 as described above as a conductive material. Composite conductive particle 1 has high conductivity and high filling property as described above, and the conductive resin composition containing composite conductive particle 1 as a conductive material can take over the aforementioned effect of composite conductive particle 1. That is, according to the conductive resin composition of the present invention, composite conductive particle 1 having high conductivity is contained, and it is possible to fill the conductive resin composition with composite conductive particles 1 with high density. Therefore, it is possible to provide a conductive resin composition with high conductivity.

The conductive resin composition is specifically a composition in which composite conductive particles 1 are dispersed in resin, and examples of the conductive resin composition include conductive paste, conductive paint, conductive adhesive, conductive ink, a conductive film, a conductive molding, and a conductive coated film. Such conductive resin compositions can be produced, for example, by kneading composite conductive particles 1 into resin, or by dispersing composite conductive particles 1 in a resin solution.

As the resin, conventionally and publicly known resins that are used for this kind of intended use can be used, and examples of the resin include thermosetting acrylic resin/melamine resin, thermosetting acrylic resin/cellulose acetate butyrate (CAB)/melamine resin, thermosetting polyester (alkyd) resin/melamine resin, thermosetting polyester (alkyd)/CAB/melamine resin, isocyanate curing type urethane resin/cold curing type acrylic resin, and water diluted acryl emulsion/melamine resin.

Although the content of conductive particles in the conductive resin composition differs depending on the intended use, and is not particularly limited, for example, it is preferably greater than or equal to 10 parts by mass and less than or equal to 100 parts by mass relative to 100 parts by mass of resin. When it is less than 10 parts by mass, the conductivity of the conductive resin composition may be insufficient, whereas when it is greater than 100 parts by mass, the amount of conductive particles in the conductive resin composition is too large, and the handleability may be impaired.

The conductive resin composition may contain any other component besides the resin and composite conductive particle 1. Examples of the component include glass frit, metal alkoxide, a viscosity adjusting agent, and a surface adjusting agent.

<Conductive Coated Article>

The conductive coated article according to the present embodiment is a coated article having a base and a coated film formed of the conductive resin composition on the base. Therefore, the conductive coated article has high conductivity.

Specific examples of the conductive coated article include an electrode, wiring, a circuit, a conductive junction structure, and a conductive pressure sensitive adhesive tape. The shape and the thickness of the coated film are not particularly limited, and a desired thickness can be employed depending on the intended use.

Regarding the base, the material thereof is not particularly limited, and the base may be formed of metal, organic substances such as plastic, inorganic substances such as ceramics and glass, and paper and wood.

As the method for coating the base with the conductive resin composition, a conventionally and publicly known coating method can be employed without any limitation, and any method can be employed.

EXAMPLES

Hereinafter, the present invention will be described in detail by way of examples; however, it is to be noted that the present invention is not limited to these examples.

Example 1

In the following manner, a conductive powder (composite conductive particles) according to Example 1 was produced. First, as a material of first particles and second particles, silica powder (product name: "ADMAFINE SO-C6", available from Admatechs Company Limited) was prepared. The powder had the following properties.

Specific surface area: 35922 $cm^2/cm^3$
D10: 0.69 μm
D50: 1.83 μm

Next, a stirring device having the configuration as shown in FIG. 4 was prepared. Regarding the prepared stirring device, the maximum capacity of a stirring vessel was 2.0 L, and the relation between an inner diameter D1 of the stirring vessel and an outer diameter D2 of a stirring blade (D1:D2) fell within the range of 7:3 to 6:4. Also in the later-described plating treatment, the relation between a height H1 of a plating treatment solution and a height H2 of the stirring blade in the stirring vessel (H1:H2) fell within the range of 9.9:0.1 to 9:1.

In the stirring vessel of the prepared stirring device, 10 g of the silica powder and 0.05 L of ion exchange water were introduced, and the stirring blade was rotated to form a slurry. To the slurry, a solution prepared by dissolving 0.2 g of stannous chloride in 0.05 L of ion exchange water was added, and stirred for 5 minutes. The blade circumferential speed at this time was 5 m/sec, and the internal temperature of the vessel was 30° C. As a result, stannous ions were carried on the surfaces of silica particles constituting the silica powder. Then, the slurry after the above treatment was subjected to solid-liquid separation, and a solid component A obtained was washed with ion exchange water. The condition of solid-liquid separation described hereinafter is the same as the present condition.

Next, 0.45 L of ion exchange water was introduced into the stirring vessel, and solid component A above after washing was added. Then, after stirring at a blade circumferential speed of 2.7 m/sec for 1 minute, aqueous solutions 1 to 3 described below were added and stirred at the same blade circumferential speed for 30 minutes. In this manner, the surfaces of silica particles were subjected to an electroless plating treatment for forming a silver coating as a first metal coating and a second metal coating that cover the surfaces. The internal temperature of the vessel at this time was 30° C.

Aqueous solution 1: aqueous solution prepared by dissolving 6.75 g of silver nitrate and 30 mL of 25% ammonia water in 300 mL of ion exchange water.

Aqueous solution 2: aqueous solution prepared by dissolving 2.7 g of sodium hydroxide in 300 mL of ion exchange water.

Aqueous solution 3: aqueous solution prepared by dissolving 40.5 g of glucose in 300 mL of ion exchange water.

The treatment solution after the plating treatment was subjected to solid-liquid separation, and a solid component B obtained was washed with ion exchange water.

Solid component B thus obtained contains composite conductive particles according to the present invention having the feature shown in FIG. 1. Then, solid component B obtained after washing was added into an oleic acid-containing alcohol solution introduced into another stirring vessel, and stirred for 10 minutes to form a protective layer of oleic acid on the surfaces of the composite conductive particles. As the oleic acid-containing alcohol solution, a solution prepared by dissolving 2 g of oleic acid in 100 mL of isopropyl alcohol was used.

After forming the protective layer, the obtained slurry was subjected to solid-liquid separation, and a solid component C obtained was washed with ion exchange water. The solid component thus obtained contains composite conductive particles having a protective layer. Then, solid component C obtained after washing was subjected to a drying treatment at 110° C. in a vacuum environment to obtain a conductive powder according to Example 1. The color tone of the conductive powder was brown.

Next, a stirring device having the configuration as shown in FIG. 4 was prepared. Regarding the prepared stirring device, the maximum capacity of a stirring vessel was 0.5 L, and ratios of D1:D2 and H1:H2 were the same as those in Example 1.

Next, in the stirring vessel of the prepared stirring device, 10 g of the silica powder, and 0.05 L of ion exchange water were introduced, and a stirring blade was rotated to form a slurry. To the slurry, a solution prepared by dissolving 0.2 g of tin fluoride in 0.05 L of ion exchange water was added, and stirred for 5 minutes. The blade circumferential speed at this time was 5 m/sec, and the internal temperature of the vessel was 50° C. As a result, tin ions were carried on the surfaces of silica particles constituting the silica powder. Then, the slurry after the above treatment was subjected to solid-liquid separation, and a solid component A obtained was washed with ion exchange water.

Next, 0.2 L of ion exchange water was introduced into the stirring vessel, and solid component A above after washing was added. Then, after stirring at a blade circumferential speed of 2.7 m/sec for 1 minute, aqueous solutions 1 to 3 described below were added and stirred at the same blade circumferential speed for 30 minutes. In this manner, the surfaces of silica particles were subjected to an electroless plating treatment for forming a silver coating as a first metal coating and a second metal coating that cover the surfaces. The internal temperature of the vessel at this time was 30° C.

Aqueous solution 1: aqueous solution prepared by dissolving 1.75 g of silver nitrate and 8 mL of 25% ammonia water in 50 mL of ion exchange water.

Aqueous solution 2: aqueous solution prepared by dissolving 0.7 g of sodium hydroxide in 50 mL of ion exchange water.

Aqueous solution 3: aqueous solution prepared by dissolving 10.5 g of glucose in 50 mL of ion exchange water.

The treatment solution after the plating treatment was subjected to solid-liquid separation, and a solid component B obtained was washed with ion exchange water. Solid component B thus obtained contains composite conductive particles according to the present invention having the feature shown in FIG. 1. Then, solid component B obtained after washing was added into an oleic acid-containing alcohol solution introduced into another stirring vessel, and stirred for 10 minutes to form a protective layer of oleic acid on the surfaces of the composite conductive particles. As the oleic acid-containing alcohol solution, a solution prepared by dissolving 1.5 g of oleic acid in 0.3 L of isopropyl alcohol was used.

After forming the protective layer, the obtained slurry was subjected to solid-liquid separation, and a solid component C obtained was washed with ion exchange water. Solid component C thus obtained contains composite conductive particles having a protective layer. Then, solid component C obtained after washing was subjected to a drying treatment at 110° C. in a vacuum environment to obtain a conductive powder according to Example 2. The color tone of the conductive powder was blackish brown.

Example 2

In the following manner, a conductive powder (composite conductive particles) according to Example 2 was produced. First, as a material of first particles and second particles, silica powder (product name: "ADMAFINE SO-C6", available from Admatechs Company Limited) was prepared.

Example 3

In the following manner, a conductive powder (composite conductive particles) according to Example 3 was produced. First, as a material of first particles and second particles, silica powder (product name: "ADMAFINE SO-C6", available from Admatechs Company Limited) was prepared.

Next, a stirring device having the configuration as shown in FIG. 4 was prepared. Regarding the prepared stirring device, the maximum capacity of a stirring vessel was 1 L, and ratios of D1:D2 and H1:H2 were the same as those in Example 1. In the same manner as in Example 2, a solid component A after washing was obtained.

Next, 0.5 L of ion exchange water was introduced into the stirring vessel, and further solid component A above after washing was added. Then, after stirring at a blade circumferential speed of 2.7 m/sec for 1 minute, aqueous solutions 1 to 3 described below were added and stirred at the same blade circumferential speed for 30 minutes. In this manner, the surfaces of silica particles were subjected to an electroless plating treatment for forming a silver coating as a first metal coating and a second metal coating that cover the surfaces. The internal temperature of the vessel at this time was 30° C.

Aqueous solution 1: aqueous solution prepared by dissolving 3.9 g of silver nitrate and 18 mL of 25% ammonia water in 110 mL of ion exchange water.

Aqueous solution 2: aqueous solution prepared by dissolving 1.5 g of sodium hydroxide in 110 mL of ion exchange water.

Aqueous solution 3: aqueous solution prepared by dissolving 23.6 g of glucose in 110 mL of ion exchange water.

The treatment solution after the plating treatment was subjected to solid-liquid separation, and a solid component B obtained was washed with ion exchange water. Solid component B thus obtained contains composite conductive particles according to the present invention having the feature shown in FIG. 1. Then, solid component B obtained after washing was added into an oleic acid-containing alcohol solution introduced into another stirring vessel, and stirred for 10 minutes to form a protective layer of oleic acid on the surfaces of the composite conductive particles. As the oleic acid-containing alcohol solution, a solution prepared by dissolving 1.5 g of oleic acid in 0.3 L of isopropyl alcohol was used.

After forming the protective layer, the obtained slurry was subjected to solid-liquid separation, and a solid component C obtained was washed with ion exchange water. Solid component C thus obtained contains composite conductive particles having a protective layer. Then, solid component C obtained after washing was subjected to a drying treatment at 110° C. in a vacuum environment to obtain a conductive powder according to Example 3. The color tone of the conductive powder was grayish brown.

Example 4

In the following manner, a conductive powder (composite conductive particles) according to Example 4 was produced. First, as a material of first particles and second particles, silica powder (product name: "ADMAFINE SO-C6", available from Admatechs Company Limited) was prepared.

Next, a stirring device having the configuration as shown in FIG. 4 was prepared. Regarding the prepared stirring device, the maximum capacity of a stirring vessel was 3 L, and ratios of D1:D2 and H1:H2 were the same as those in Example 1. In the same manner as in Example 2, a solid component A after washing was obtained.

Next, 1.2 L of ion exchange water was introduced into the stirring vessel, and further solid component A above after washing was added. Then, after stirring at a blade circumferential speed of 2.7 m/sec for 1 minute, aqueous solutions 1 to 3 described below were added and stirred at the same blade circumferential speed for 30 minutes. In this manner, the surfaces of silica particles were subjected to an electroless plating treatment for forming a silver coating as a first metal coating and a second metal coating that cover the surfaces. The internal temperature of the vessel at this time was 30° C.

Aqueous solution 1: aqueous solution prepared by dissolving 10.5 g of silver nitrate and 47 mL of 25% ammonia water in 300 mL of ion exchange water.

Aqueous solution 2: aqueous solution prepared by dissolving 4.2 g of sodium hydroxide in 300 mL of ion exchange water.

Aqueous solution 3: aqueous solution prepared by dissolving 63 g of glucose in 300 mL of ion exchange water.

The treatment solution after the plating treatment was subjected to solid-liquid separation, and a solid component B obtained was washed with ion exchange water. Solid component B thus obtained contains composite conductive particles according to the present invention having the feature shown in FIG. 1. Then, solid component B obtained after washing was added into an oleic acid-containing alcohol solution introduced into another stirring vessel, and stirred for 10 minutes to form a protective layer of oleic acid on the surfaces of the composite conductive particles. As the oleic acid-containing alcohol solution, a solution prepared by dissolving 1.5 g of oleic acid in 0.3 L of isopropyl alcohol was used.

After forming the protective layer, the obtained slurry was subjected to solid-liquid separation, and a solid component C obtained was washed with ion exchange water. Solid component C thus obtained contains composite conductive particles having a protective layer. Then, solid component C obtained after washing was subjected to a drying treatment at 110° C. in a vacuum environment to obtain a conductive powder according to Example 4. The color tone of the conductive powder was yellowish white.

Example 5

In the following manner, a conductive powder (composite conductive particles) according to Example 5 was produced. First, as a material of first particles and second particles, silica powder available from Admatechs Company Limited was prepared. The powder had the following properties.

Specific surface area: 7577 $cm^2/cm^3$
D10: 8.55 µm
D50: 16.24 µm

Next, a stirring device having the configuration as shown in FIG. 4 was prepared. Regarding the prepared stirring device, the maximum capacity of a stirring vessel was 5.0 L, and ratios of D1:D2 and H1:H2 were the same as those in Example 1.

Next, in the stirring vessel of the prepared stirring device, 10 g of the silica powder, and 0.02 L of ion exchange water were introduced, and a stirring blade was rotated to form a slurry. To the slurry, 10 mL of a solution containing palladium chloride and stannous chloride was added, and stirred for 10 minutes. The blade circumferential speed at this time was 1.7 m/sec, and the internal temperature of the vessel was 50° C. As a result, stannum palladium colloid particles were adsorbed on the surfaces of silica particles constituting the silica powder. Then, the slurry after the above treatment was subjected to solid-liquid separation, and a solid component A obtained was washed with ion exchange water.

Next, 0.1 L of ion exchange water was introduced into the stirring vessel, and solid component A above after washing was added. Then, after stirring at a blade circumferential speed of 1.7 m/sec for 1 minute, 0.1 L of 10% sulfuric acid was added and stirred for 5 minutes. The blade circumferential speed at this time was 1.7 m/sec, and the internal temperature of the vessel was 25° C. As a result, stannum was removed, and palladium was metalized. Then, the slurry after the above treatment was subjected to solid-liquid separation, and a solid component B obtained was washed with ion exchange water.

Next, 0.25 L of ion exchange water was introduced into the stirring vessel, and solid component B obtained after washing was added. Then, after stirring at a blade circumferential speed of 5.3 m/sec for 1 minute, aqueous solutions 1 to 3 described below were added and stirred at the same blade circumferential speed for 20 minutes. In this manner, the surfaces of silica particles were subjected to an electroless plating treatment for forming a nickel-phosphorus coating as a first metal coating and a second metal coating that cover the surfaces. The internal temperature of the vessel at this time was 50° C.

Aqueous solution 1: aqueous solution prepared by dissolving 14 g of nickel sulfate in 30 mL of ion exchange water.

Aqueous solution 2: aqueous solution prepared by dissolving 3.1 g of sodium hypophosphite in 30 mL of ion exchange water.

Aqueous solution 3: aqueous solution prepared by dissolving 3.0 g of sodium succinate in 100 mL of ion exchange water.

The treatment solution after the plating treatment was subjected to solid-liquid separation, and a solid component C obtained was washed with ion exchange water. Solid component C thus obtained contains composite conductive particles according to the present invention having the feature shown in FIG. 1. Then, solid component C obtained after washing was subjected to a drying treatment at 110° C. in a vacuum environment to obtain a conductive powder according to Example 5. The color tone of the conductive powder was black.

Comparative Example 1

The same manner as in Example 1 was conducted except that the blade circumferential speed in the plating treatment was 20 m/sec. In this manner, a conductive powder according to Comparative Example 1 was produced. The color tone of the conductive powder was gray.

<SEM Observation>

Figure 5:
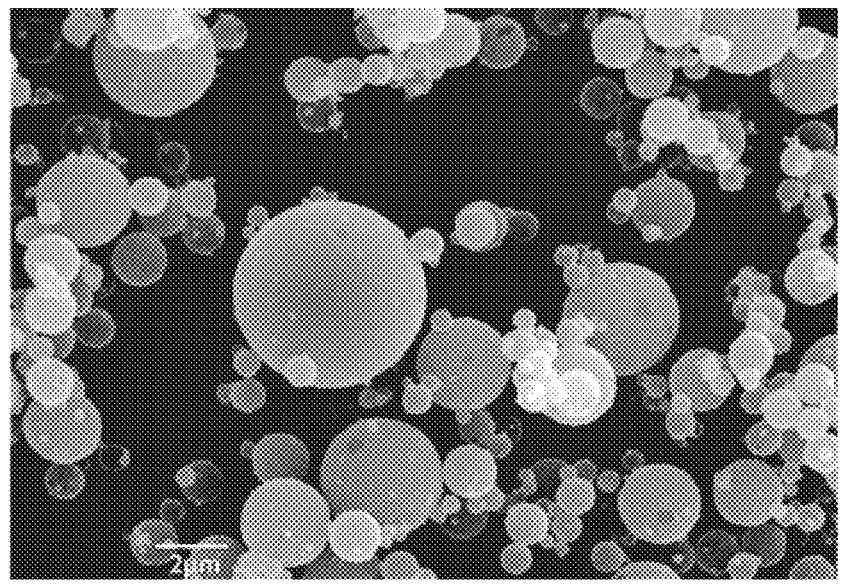
FIG. 5 is a view showing an SEM photograph of conductive powder in Example 1.
Figure 6:
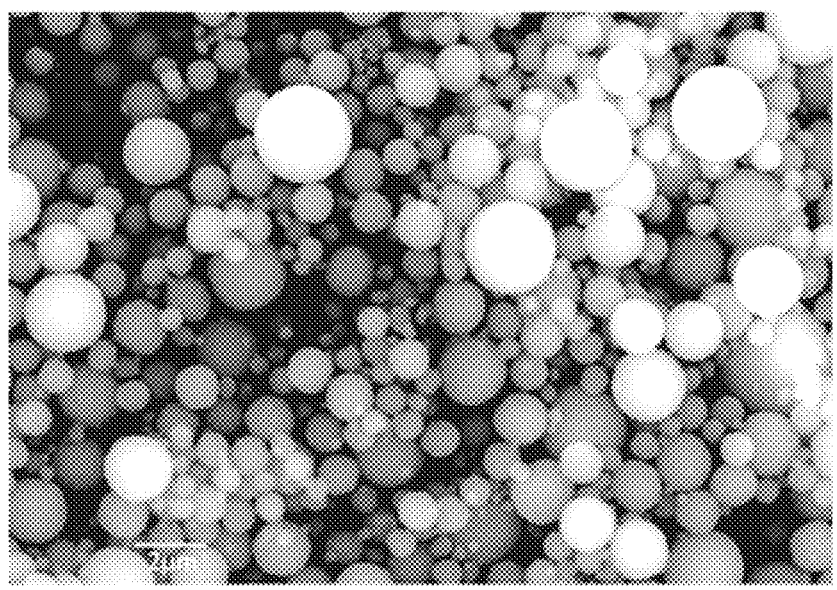
FIG. 6 is a view showing an SEM photograph of conductive power in Comparative Example 2.

For each conductive powder of Example 1 and Comparative Example 1, SEM observation was conducted. Specifically, a sample in which each conductive powder was dispersed on a carbon tape was prepared. Then, a reflected electronic image of each sample was taken in the conditions of an accelerating voltage of 20 kV and a magnification of 5000 times by using a scanning electron microscope (product name: "VE-7800", available from KEYENCE CORPORATION). The SEM photograph of conductive powder in Example 1 is shown in FIG. 5, and the SEM photograph of conductive powder in Comparative Example 1 is shown in FIG. 6. As a reference, the SEM photograph of silica powder that is used as a material is shown in FIG. 7.

Figure 7:
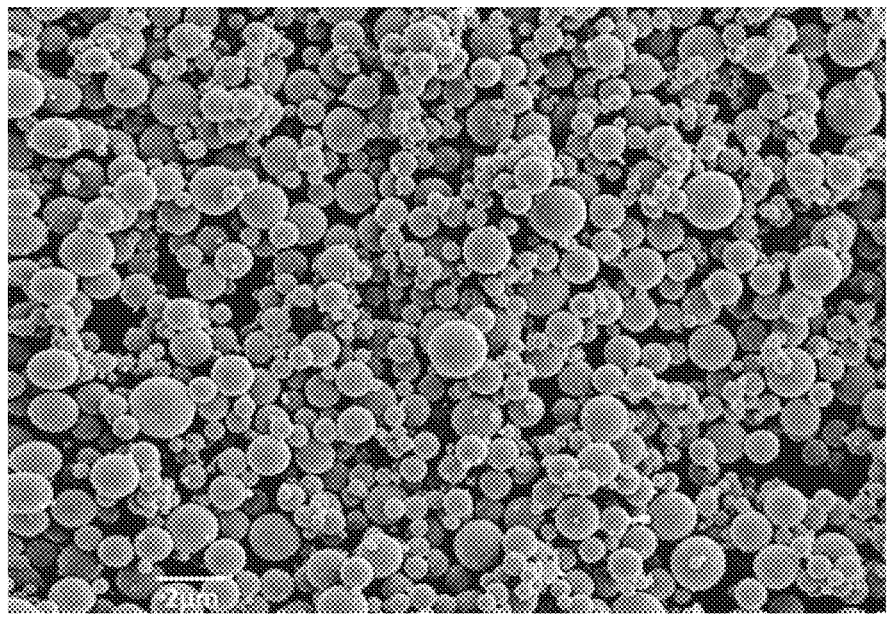
FIG. 7 is a view showing an SEM photograph of silica powder.

Referring to FIG. 5 to FIG. 7, in the conductive powder of Example 1 shown in FIG. 5, conductive particles in such a form that a conductive particle having a smaller particle diameter adheres to the surface of a conductive particle having a larger particle diameter, namely composite conductive particles were observed. In contrast to this, in the conductive powder of Comparative Example 1 shown in FIG. 6, composite conductive particles were not observed.

In comparison with FIG. 6 and FIG. 7, it was recognized that the conductive powder of Comparative Example 1 is in such a form that the surface of each silica particle is covered with Ag.

Also for each conductive powder of Examples 2 to 5, SEM observation was conducted in the same manner, and conductive particles in such a form that a conductive particle having a smaller particle diameter adheres to the surface of a conductive particle having a larger particle diameter, namely composite conductive particles were observed as shown in Table 1.

<Particle Diameter>

For each conductive powder of Examples 1 to 5 and Comparative Example 1, each SEM photograph obtained by SEM observation for multiple fields as shown in FIG. 5 and FIG. 6 was analyzed to determine the particle diameter of each particle. In Example 1, since composite conductive particles in which a plurality of particles having a smaller particle diameter (second conductive particles) adhere to the surface of one particle (first conductive particle) having a larger particle diameter were observed, respective particle diameters of the first conductive particle and the second conductive particle were determined. The results are shown in "particle diameter (μm)" in Table 1. Each particle diameter is an average value of diameters of 50 particles arbitrarily selected from SEM photographs obtained by SEM observation of multiple fields.

<Adhering Rate>

Regarding each conductive powder of Examples 1 to 5, by analyzing the SEM photograph as shown in FIG. 5, the adhering rate of the second conductive particle to the first conductive particle was determined. Calculation of the adhering rate was conducted according to the aforementioned calculation method by using image processing software (product name: "WinROOF", MITANI CORPORATION). The results are shown in the column of "adhering rate (%)" in Table 1. The adhering rate is an average value of arbitrarily selected 50 composite conductive particles.

<Metal Coverage>

For each conductive powder of Examples 1 to 5 and Comparative Example 1, metal coverage was calculated. To be more specific, the calculation was conducted in the following procedure. First, the weight of each conductive powder before quantification of the metal amount by an atomic absorption photometer (weight of conductive powder before dissolution by an acid solution) was measured. Then, each conductive powder for which the weight was measured was dissolved in an acid solution to prepare a sample. For the prepared samples, by using atomic absorption photometer (product name: "A-2000", available from Hitachi High-Tech Fielding Corporation), the metal amount contained in each conductive powder (corresponding to the total amount of metal covering the surfaces of silica particles constituting each conductive particle) was measured. Then, based on the obtained quantification results of metal, metal coverage (% by weight) of each conductive particle was calculated according to the following formula (2). The results are shown in the column of "coverage (%)" in Table 1.

Regarding the aforementioned each sample, an appropriate amount of conductive particles was taken, and dissolved over about 30 minutes at room temperature by using a mixed acid of nitric acid and hydrofluoric acid, and the resultant solution was diluted to have a concentration suited for measurement. The measurement wavelength was 328.1 nm (silver), 232.0 nm (nickel), and the gas condition was air-acetylene.

$$\text{Amount of metal coating (\% by weight)} = W1/W2 \times 100 \quad (2)$$

(in formula (2), W1 represents the weight of metal constituting the metal coating, and W2 represents the weight of conductive powder before dissolution by the acid solution.)

TABLE 1

|  | Particle diameter (μm) | Adhering rate (%) | Coverage (%) |
|---|---|---|---|
| Example 1 | First: 2.2 Second: 0.5 | 19.2 | 30 |
| Example 2 | First: 2.1 Second: 0.4 | 7.2 | 10 |
| Example 3 | First: 2.2 Second: 0.4 | 11.6 | 20 |
| Example 4 | First: 2.5 Second: 0.6 | 28.3 | 40 |
| Example 5 | First: 17.1 Second: 0.9 | 23.5 | 11 |
| Comparative Example 1 | 6.71 | — | 30 |

<Conductivity>

Specific resistance of each conductive powder of Examples 1 to 5 and Comparative Example 1 was calculated, and conductivity of each conductive powder was evaluated. Specifically, each conductive powder and resin (product name: "NIPPE ACRYL AUTO CLEAR SUPER", available from NIPPONPAINT Co., Ltd.) were kneaded so that the blending ratio (conductive powder:resin) was 60 vol %: 40 vol % to produce a resin composition containing each conductive powder.

Then each resin composition was applied on a PET film so that the coated film thickness after drying was 30 μm, and dried at 80° C. for 1 hour to form a coated film on the PET film. The thickness of the coated film was examined by measurement with a Digimatic Standard Outside Micrometer (product name: "IP65 COOLANT PROOF Micrometer", available from Mitutoyo Corporation).

For each coated film, arbitrary three points were measured by using a four-probe surface resistivity meter (product name: "Loresta GP", available from Mitsubishi Chemical Analytech Co., Ltd.), and the average value was determined as a specific resistance (Ω·cm). The results are shown in "specific resistance (Ω·cm)" in Table 2. Lower specific resistance indicates better conductivity.

<Filling Property>

Tap density of each conductive powder of Examples 1 to 5 and Comparative Example 1 was measured, and filling property of each conductive powder was evaluated. Tap density can be measured by a method in accordance with JIS Z2512:2012. For measurement of tap density, a tapping powder reduction meter (model: "TPM-1", available from TSUTSUI SCIENTIFIC INSTRUMENTS CO., LTD.) was used. The results are shown in "tap density (g/cm$^3$)" in Table 2. Larger tap density indicates better filling property.

TABLE 2

|  | Specific resistance (Ω · cm) | Tap density (g/cm$^3$) |
|---|---|---|
| Example 1 | 0.0016 | 1.03 |
| Example 2 | 0.0091 | 1.68 |
| Example 3 | 0.0043 | 1.31 |
| Example 4 | 0.00062 | 0.83 |
| Example 5 | 0.61 | 1.45 |
| Comparative Example 1 | 0.0026 | 0.81 |

Comparing Example 1 and Comparative Example 1 by referring to Table 1 and Table 2, the conductive powder of Example 1 could form a coated film having lower specific resistance than that formed of the conductive powder of Comparative Example 1 although the coverages of the metal coatings were identical. Also, the conductive powders of Examples 1 to 5 showed higher tap densities compared with that of Comparative Example 1. As a result, it was confirmed that the composite conductive powder can exert both characteristics of high conductivity and high filling property.

<Observation of Cross Section>

A cross section of conductive powder of Example 1 was observed. First, epoxy resin and conductive powder were mixed and cured, and then a sample for observation of a cross section of conductive powder was prepared by using an ion milling device. By using a scanning electron microscope (product name: "SU8020", available from Hitachi High-Technologies Corporation.), a cross section of conductive powder in the sample was observed in the conditions of an accelerating voltage of 50 kV and a magnification of 30000 times, to take a reflected electronic image.

Figure 8:
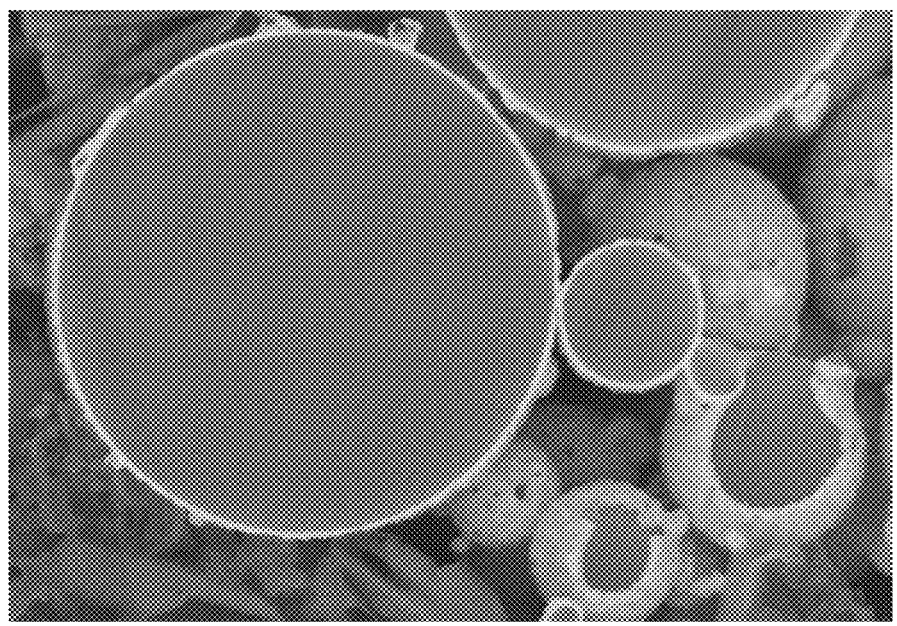
FIG. 8 is a view showing an SEM photograph of a cross section of conductive powder in Example 1.

FIG. 8 shows an SEM photograph of a cross section of conductive powder in Example 1. As confirmed from FIG. 8, in the conductive powder of Example 1, the surface of a silica particle serving as a first particle is covered with a silver coating serving as a first metal coating in a first conductive particle, and the surface of a silica particle serving as a second particle is covered with a silver coating serving as a second metal coating in a second conductive particle, and the first conductive particle is larger than the second conductive particle, and the second conductive particles adhere to the surface of the first conductive particle.

Regarding Examples 2 to 5, each cross section was observed in the same manner as in Example 1, and likewise Example 1 it was confirmed that the surface of a silica particle serving as a first particle is covered with a metal coating (silver coating in Examples 2 to 4, nickel-phosphorous coating in Example 5) serving as a first metal coating in a first conductive particle, and the surface of a silica particle serving as a second particle is covered with a metal coating (silver coating in Examples 2 to 4, nickel-phosphorous coating in Example 5) serving as a second metal coating in a second conductive particle, and the first conductive particle is larger than the second conductive particle, and the second conductive particles adhere to the surface of the first conductive particle.

While the embodiments and examples of the present invention have been described, it is ab initio intended to appropriately combine the features of these embodiments and examples.

It is to be understood that the embodiments and the examples disclosed herein are not restrictive but illustrative in all respects. The scope of the present invention is defined by claims rather than by the above description, and any modification within the equivalent meaning and scope of claim is intended to be involved in the present invention.

REFERENCE SIGNS LIST

1 Composite conductive particles, 10 First conductive particle, 11 First particle, 12 First metal coating, 20 Second conductive particles, 21 Second particle, 22 Second metal coating, 30 Stirring device, 31 Stirring vessel, 32 Stirring blade, 32a Shaft part, 32b Blade part

The invention claimed is:

1. A composite conductive particle comprising:
   a first conductive particle having a particle diameter of greater than or equal to 0.1 µm and less than or equal to 50 µm; and
   a second conductive particle adhering to a surface of said first conductive particle and having a particle diameter of greater than or equal to 50 nm and less than or equal to 1000 nm,
   said first conductive particle being composed of a first particle and a first metal coating covering a surface of said first particle,
   said second conductive particle being composed of a second particle and a second metal coating covering a surface of said second particle,
   a particle diameter of said first conductive particle being larger than a particle diameter of said second conductive particle,
   an adhering rate of said second conductive particle to said first conductive particle being greater than or equal to 2% and less than or equal to 40%, and
   each of said first particle and said second particle being formed of silica.

2. The composite conductive particle according to claim 1, wherein each of said first metal coating and said second metal coating is formed of at least one selected from the group consisting of silver, gold, copper, nickel, platinum, tin, and alloys thereof.

3. The composite conductive particle according to claim 1, wherein said first conductive particle has a protective layer containing an organic acid.

4. A conductive resin composition comprising the composite conductive particle according to claim 1 as a conductive material.

5. A conductive coated article comprising:
   a base to be coated; and
   a conductive resin composition according to claim 4 coated onto the base.

* * * * *